(12) United States Patent
Kobayashi et al.

(10) Patent No.: US 10,607,787 B2
(45) Date of Patent: Mar. 31, 2020

(54) ELECTRODE FOIL PRODUCTION METHOD AND CAPACITOR PRODUCTION METHOD

(71) Applicant: Panasonic Intellectual Property Management Co., Ltd., Osaka (JP)

(72) Inventors: Kyohei Kobayashi, Hyogo (JP); Yukiyasu Sugihara, Kyoto (JP); Hiroshi Yoshida, Kyoto (JP); Mitsuhisa Yoshimura, Osaka (JP); Hiromi Nakanishi, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/981,704

(22) Filed: May 16, 2018

(65) Prior Publication Data

US 2018/0261393 A1    Sep. 13, 2018

Related U.S. Application Data

(63) Continuation of application No. PCT/JP2016/004723, filed on Oct. 27, 2016.

(30) Foreign Application Priority Data

Nov. 30, 2015    (JP) .................................. 2015-234229

(51) Int. Cl.
*H01G 9/055* (2006.01)
*H01G 9/15* (2006.01)
(Continued)

(52) U.S. Cl.
CPC ............... *H01G 9/055* (2013.01); *C25F 3/02* (2013.01); *C25F 3/14* (2013.01); *C25F 7/00* (2013.01);
(Continued)

(58) Field of Classification Search
CPC .......... H01G 9/055; H01G 9/0036; C25F 3/02
See application file for complete search history.

(56) References Cited

U.S. PATENT DOCUMENTS 9,365,947 B2 *   6/2016  Uzoh ................... H05K 1/0212
2004/0052032 A1  3/2004  Monden et al.
(Continued)

FOREIGN PATENT DOCUMENTS

CN    101552140 A    10/2009
JP    60-031217      2/1985
(Continued)

OTHER PUBLICATIONS

English Translation of Chinese Search Report dated May 5, 2019 for the related Chinese Patent Application No. 201680068471.3.
(Continued)

*Primary Examiner* — Seahvosh Nikmanesh
(74) *Attorney, Agent, or Firm* — McDermott Will & Emery LLP

(57) ABSTRACT

A method for producing an electrode foil includes: a first step of preparing a metal foil, the metal foil having a strip shape; a second step of disposing a masking member so as to cover part of a principal surface of the metal foil; and a third step of partially etching the principal surface of the metal foil by applying current between the metal foil and an electrode while the metal foil faces the electrode via the masking member in etching liquid after the second step. The masking member has a strip shape. In the second step, the masking member is disposed along a longitudinal direction of the metal foil so as to be separated from both side edges of the metal foil.

10 Claims, 4 Drawing Sheets

(51) Int. Cl.
  *C25F 7/00* (2006.01)
  *C25F 3/14* (2006.01)
  *C25F 3/02* (2006.01)
  *H01G 9/00* (2006.01)
  *H01G 9/07* (2006.01)

(52) U.S. Cl.
  CPC ............ *H01G 9/15* (2013.01); *H01G 9/0032* (2013.01); *H01G 9/0036* (2013.01); *H01G 9/07* (2013.01)

(56) References Cited

U.S. PATENT DOCUMENTS

| | | | |
|---|---|---|---|
| 2007/0242418 A1* | 10/2007 | Hashimoto | H01G 9/012 361/530 |
| 2009/0212013 A1 | 8/2009 | Imanaka et al. | |
| 2015/0096790 A1* | 4/2015 | Uzoh | H05K 1/0212 174/252 |
| 2017/0345580 A1* | 11/2017 | Hemphill | H01G 9/045 |
| 2018/0258548 A1* | 9/2018 | Kobayashi | H01G 9/0032 |

FOREIGN PATENT DOCUMENTS

| | | |
|---|---|---|
| JP | 64-008299 | 1/1989 |
| JP | 2005-340794 | 12/2005 |
| TW | 588386 B | 5/2004 |

OTHER PUBLICATIONS

International Search Report of PCT application No. PCT/JP2016/004723 dated Dec. 20, 2016.

* cited by examiner

ELECTRODE FOIL PRODUCTION METHOD AND CAPACITOR PRODUCTION METHOD

RELATED APPLICATIONS

This application is a continuation of the PCT International Application No. PCT/JP2016/004723 filed on Oct. 27, 2016, which claims the benefit of foreign priority of Japanese patent application No. 2015-234229 filed on Nov. 30, 2015, the contents all of which are incorporated herein by reference.

BACKGROUND

1. Technical Field

The present disclosure relates to an electrode foil production method and a capacitor production method.

2. Description of the Related Art

A metal foil containing a valve metal is used as an anode body of a capacitor element. All or part of a principal surface of the metal foil is etched in order to increase capacitance of the capacitor element. For example, Unexamined Japanese Patent Publication No. 2005-340794 discloses that a coat as a masking member is formed on a principal surface of a strip-shaped metal foil in an area including both side edges in a width direction, and etching is performed on the principal surface in an area which is not covered by the coat.

SUMMARY

A method for producing an electrode foil according to a first aspect of the present disclosure includes: a first step of preparing a metal foil containing first metal, the metal foil having a strip shape; a second step of disposing a masking member so as to cover part of a principal surface of the metal foil; and a third step of partially etching the principal surface of the metal foil by applying current between the metal foil and an electrode while the metal foil faces the electrode via the masking member in etching liquid after the second step. The masking member has a strip shape. In the second step, the masking member is disposed along a longitudinal direction of the metal foil so as to be separated from both side edges of the metal foil.

A method for producing a capacitor according to a second aspect of the present disclosure includes: a step of preparing the electrode foil produced by the above-described method; and a step of forming a dielectric layer on the principal surface of the electrode foil, the principal surface being etched, and then causing the dielectric layer to contact with electrolyte.

According to the present disclosure, an electrode foil in which wrinkle and/or warpage is suppressed can be obtained, and thus a capacitor including the electrode foil achieves high quality.

DETAILED DESCRIPTION OF EMBODIMENT

Prior to describing an exemplary embodiment of the present disclosure, a problem found in conventional techniques will be briefly described.

After an etching step, anodizing treatment is performed on a region that is etched at the etching step (etched part). A contraction of the etched part occurs in some cases when a dielectric layer is formed on the etched part by the anodizing treatment. When a masking member is disposed so as to include both side edges of a metal foil along a longitudinal direction, an etched part formed on a surface of the metal foil is sandwiched between non-etched parts. In this case, when the etched part contracts, significant wrinkle and/or warpage is likely to occur in the etched part (in particular, a central region of the etched part). The wrinkle and/or warpage of the etched part may cause to nonuniformity of a solid electrolyte layer and a cathode extension layer to be formed on the etched part after the anodizing treatment, or failure in disposing a capacitor element into a capacitor. Thus, it is difficult to obtain a capacitor having reliable quality.

A method for producing an electrode foil according to the present disclosure is a method for producing a partially etched electrode foil. And the method includes first to third steps described below. The first step is preparing a metal foil, the metal foil having a strip shape. The second step is disposing a masking member so as to cover at least part of a principal surface of the metal foil. The third step is partially etching the principal surface of the metal foil by applying current between the metal foil and an electrode while the metal foil faces the electrode via the masking member in etching liquid after the second step. The masking member has a strip shape. In the second step, the masking member is disposed along a longitudinal direction of the metal foil so as to be separated from both side edges of the metal foil.

Figure 1:
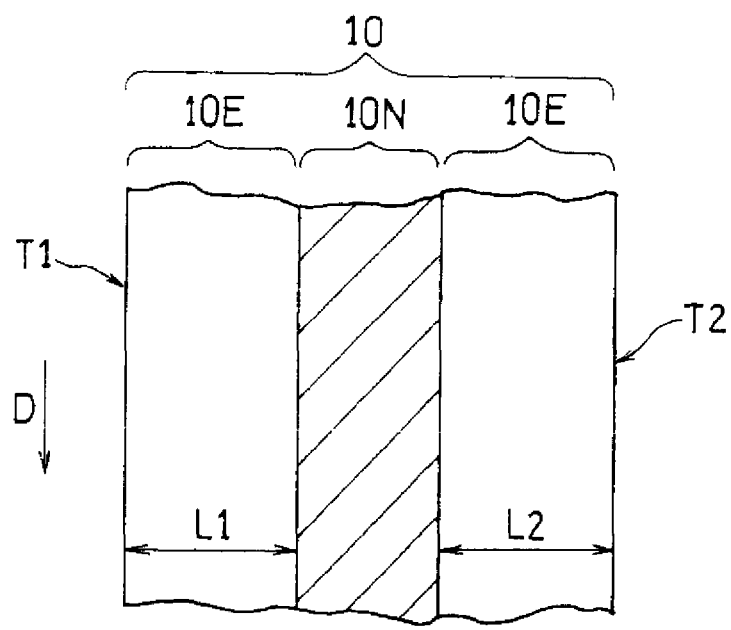
FIG. 1 is a plan view schematically illustrating an electrode foil etched through an electrolytic etching step according to an exemplary embodiment of the present disclosure.

FIG. 1 is a plan view schematically illustrating an electrode foil 10 etched through an electrolytic etching step. Through the third step, etched region 10E whose surface is etched and non-etched region 10N whose surface is not etched are formed on electrode foil 10 as illustrated in FIG. 1. Etched region 10E has an etched surface which extends from vicinity of a boundary between an area covered by masking member 4 and an area not covered by masking member 4, and includes side edge T1 or T2 of electrode foil 10. Non-etched region 10N is sandwiched between two etched regions 10E. For sake of convenience, non-etched region 10N is hatched in FIG. 1.

Figure 2:
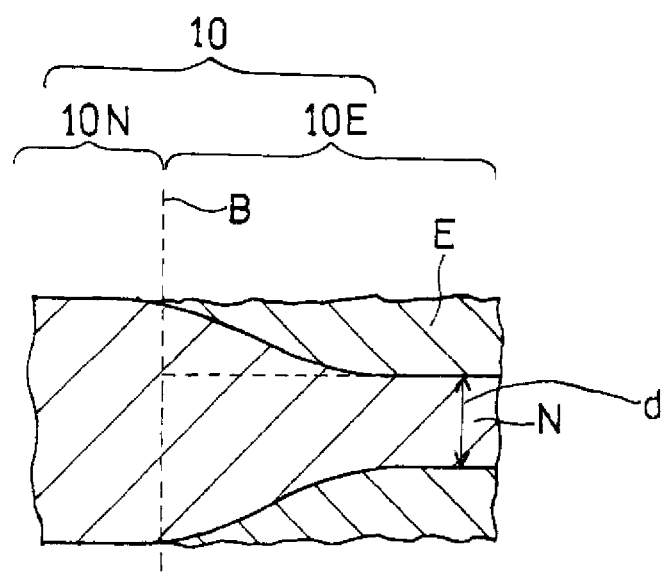
FIG. 2 is a cross-sectional view schematically illustrating the electrode foil etched by the electrolytic etching step according to the exemplary embodiment of the present disclosure.

As illustrated in FIG. 2, etched region 10E includes etched part E on surfaces, and includes non-etched part N inside. Etched part E is gradually deeper in a thickness direction at a position further away from boundary B between etched region 10E and non-etched region 10N. Thickness d of non-etched part N in etched region 10E is preferably 2 μm or more in terms of strength. FIG. 2 is a cross-sectional view schematically illustrating part of electrode foil 10 etched through an electrolytic etching step. A boundary between the area covered by masking member 4 and the area not covered by masking member 4 approximately corresponds to above-described boundary B.

After the third step, etched region 10E is provided with anodizing treatment. Through the anodizing treatment, a dielectric layer is formed on an uneven surface formed in etched region 10E. In this case, etched region 10E contracts. Specifically, contraction occurs at different degrees between etched region 10E and non-etched region 10N, and thus wrinkle and/or warpage is likely to occur to etched region 10E that contracts. In particular, when an etched region is sandwiched between non-etched regions, significant wrinkle is likely to occur to the etched region. In the present embodiment, however, etched region 10E is not sandwiched between non-etched regions 10N. Further, etched region 10E has one of side edges T (T1 and T2) released. Accordingly, contraction in etched region 10E is unlikely to be encumbered, and thus wrinkle and/or warpage occurring to etched region 10E can be reduced.

Shortest distance L1 from side edge T1 and shortest distance L2 from side edge T2, respectively, to non-etched region 10N are not particularly limited. Since etched region 10E is a region in which capacitance of a capacitor is developed, shortest distances L1 and L2 may be set as appropriate in accordance with required capacitance.

Figure 3:
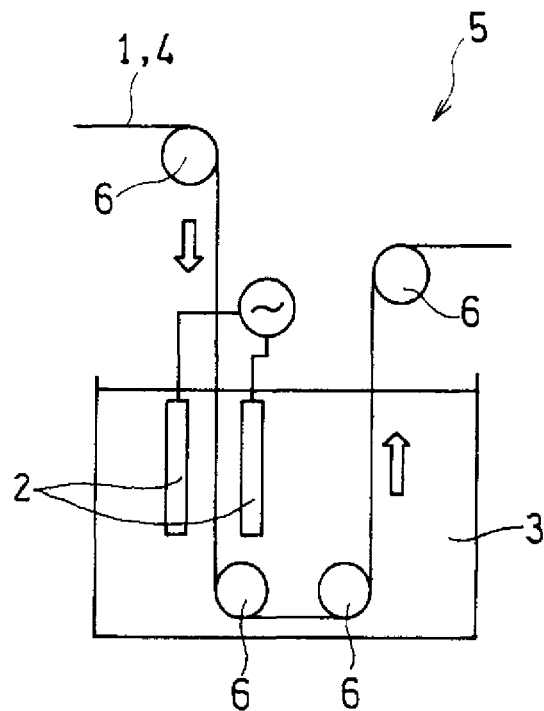
FIG. 3 is an explanatory diagram schematically illustrating an electrolytic etching device used in the electrolytic etching step according to the exemplary embodiment of the present disclosure.
Figure 4:
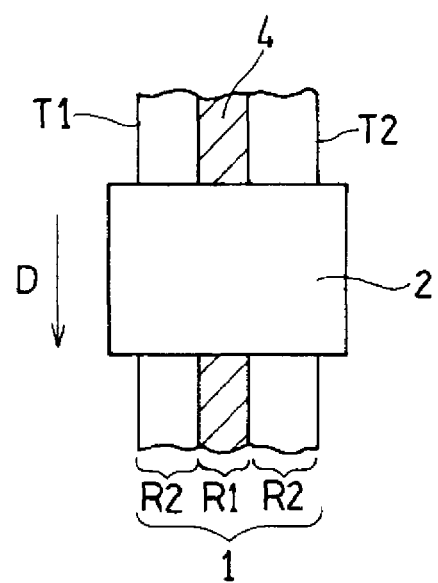
FIG. 4 is a schematic diagram illustrating a positional relation among a metal foil, a masking member, and an electrode in the electrolytic etching step.

A production method according to the present exemplary embodiment will be described below with reference to the accompanying drawings. FIG. 3 is an explanatory diagram schematically illustrating electrolytic etching device 5 used in the electrolytic etching step. FIG. 4 is a schematic diagram illustrating a positional relation among metal foil 1, masking member 4, and electrode 2 in the electrolytic etching step. For sake of convenience, masking member 4 is hatched in FIG. 4.

(First Step)

In the first step, strip-shaped metal foil 1 is prepared. Metal foil 1 contains metal (first metal). Examples of the first metal include a valve metal such as titanium, tantalum, aluminum, and niobium. Metal foil 1 may contain one, or two or more of the valve metals. Metal foil 1 may contain the first metal in an alloy or intermetallic compound. A thickness of metal foil 1 is not particularly limited. The thickness of metal foil 1 ranges from 15 μm to 300 μm, inclusive, for example.

(Second Step)

In the second step, strip-shaped masking member 4 is disposed along longitudinal direction D of metal foil 1 so as to cover first region R1 (refer to FIG. 4) having a strip shape and separated from both side edges T1 and T2 of metal foil 1. In FIG. 4, region R2 is a region (second region R2) not covered by masking member 4. A position of masking member 4 is not limited to this. For example, a plurality of strip-shaped masking members 4 may be disposed to cover a plurality of first regions R1.

Masking member 4 is not particularly limited, but may be an insulator such as resin or an electric conductor containing an electric conductive material. When masking member 4 is an insulator, a region, which faces first region R1, of a surface of electrode 2 may be masked so as to increase reliability of electrolytic etching (not illustrated). When masking member 4 is an electric conductor, masking member 4 and metal foil 1 are electrically connected with each other in the third step. This configuration suppresses current concentration near a boundary of metal foil 1 with masking member 4. By suppressing current concentration, excessive etching can be reduced in etched region 10E. In this disclosure, the phrase "the masking member is electrically connected with the metal foil" refers to a state in which electrons can move between the masking member and the metal foil.

When masking member 4 is an insulator, the resin may be thermosetting resin or thermoplastic resin. Examples of the thermosetting resin include urethane resin, phenolic resin, epoxy resin, silicone resin, and polyimide. Examples of the thermoplastic resin include acrylic resin and polyester.

When masking member 4 is an electric conductor, an electric conductive material contained in masking member 4 is not particularly limited. Examples of the electric conductive material include the above-described valve metals, metals such as silver, copper, iron, tin, lead, zinc, silica, nickel, gold, platinum, palladium, zirconium, tungsten, cobalt, and molybdenum, graphite, a carbon material such as carbon black, and conductive polymers.

When masking member 4 is an electric conductor, masking member 4 and metal foil 1 are electrically connected with each other during the electrolytic etching step. In terms of improving an efficiency of etching metal foil 1 and suppressing the above-described current concentration, it is preferable that a resistance value of masking member 4 in the thickness direction (electric resistivity of the masking member×the thickness of the masking member) is substantially equal to, for example, a resistance value of metal foil 1 in the thickness direction. In terms of making it easier to achieve such adjustment that the resistance value of masking member 4 is equal to the resistance value of metal foil 1 and to achieve physical connection with metal foil 1 as described later, masking member 4 may contain metal (second metal). The second metal contained in masking member 4 is not particularly limited, but may be the same as the first metal contained in metal foil 1 or may be a different metal element. Since masking member 4 is an electric conductor, a surface of masking member 4, which faces the electrode, is also etched.

A method for covering first region R1 of metal foil 1 with masking member 4 is not particularly limited. For example, coating with a material of masking member 4 made of resin (may contain an electric conductive material) may be applied in a strip shape along longitudinal direction D in first region R1 of metal foil 1, or masking member 4 molded in a strip shape in advance may be disposed to cover first region R1 of metal foil 1. In terms of productivity, masking member 4 may be a sheet member molded in a strip shape in advance. Examples of masking member 4 shaped in a sheet include a metal foil (a foil of second metal) containing the second metal, and a conductive tape shaped by using the above-described resin. The conductive tape may be adhesive.

The thickness of masking member 4 may be set as appropriate by taking into account a distance between electrode 2 and masking member 4. In particular, when masking member 4 is a coat formed through coating with resin, the thickness of masking member 4 ranges from 15 μm to 100 μm, inclusive, for example. This makes it easier to remove masking member 4 in a fourth step. When masking member 4 is a sheet member, the thickness of masking member 4 ranges from 15 μm to 300 μm, inclusive, for example. This makes it easier to peel sheet-shaped masking member 4 in the fourth step.

When masking member 4 is a sheet member, masking member 4 and metal foil 1 may be or may not be contacted with each other. Masking member 4 and metal foil 1 may be physically connected with each other to prevent positional shift of masking member 4 in the electrolytic etching step. When masking member 4 is the foil of second metal, it is preferable that masking member 4 and metal foil 1 are physically and electrically connected with each other by welding. In this case, a junction part between masking member 4 and metal foil 1 has a small resistance value, and thus the current concentration is likely to be reduced. Alternatively, metal foil 1 and masking member 4 may be physically connected with each other by cold welding or swaging.

(Third Step)

A step of forming etched region 10E is performed by, for example, electrolytic etching device 5 illustrated in FIG. 3. Metal foil 1 is conveyed through a plurality of rolls 6. The electrolytic etching step is performed on metal foil 1 thus conveyed.

In the electrolytic etching step, the second region other than the first region of metal foil 1 is etched by applying current between metal foil 1 and electrode 2 while metal foil 1 faces electrode 2 via strip-shaped masking member 4. In this case, masking member 4 is disposed along longitudinal direction D of metal foil 1 so as to cover first region R1 which is separated from both side edges T1 and T2 of metal foil 1 along longitudinal direction D. In FIG. 3, masking member 4 is already disposed on first region R1 of metal foil 1 to be conveyed (refer to FIG. 4).

The current flowing between metal foil 1 and electrode 2 may be alternating current as illustrated in FIG. 3 or may be direct current. Etching may be performed on both principal surfaces of metal foil 1 or may be performed only on one of the principal surfaces. When etching is performed on both principal surfaces of metal foil 1, masking member 4 may be disposed between each of principal surfaces of metal foil 1 and corresponding one of two electrodes 2 disposed facing the respective principal surfaces. In this case, as illustrated in FIG. 2, in etched region 10E, etched parts E are formed on both principal surfaces, and non-etched part N is formed between etched parts E. Accordingly, etched part E, non-etched part N, and etched part E are disposed in this order in the thickness direction in etched region 10E.

Etching liquid 3 may be well-known etching liquid used in electrolytic etching. Etching liquid 3 is, for example, water solution containing hydrochloric acid in addition to sulfuric acid, nitric acid, phosphoric acid, and/or oxalic acid. The water solution may contain various additives such as chelating agent. Concentration of hydrochloric acid in etching liquid 3, and concentration and temperature of any other acid in etching liquid 3 are not particularly limited, but may be set as appropriate in accordance with a shape of a desired etching pit and performance of a capacitor. The concentration of hydrochloric acid relative to etching liquid 3 ranges from 1 mol/L to 10 mol/L, inclusive, for example, and the concentration of any other acid ranges from 0.01 mol/L to 1 mol/L, inclusive, for example. Temperature of etching liquid 3 during the electrolytic etching step ranges from 15° C. to 60° C., inclusive, for example.

When an alternating-current power source is used, current waveform and frequency are not particularly limited. The frequency of the alternating-current power source ranges from 1 Hz to 500 Hz, inclusive, for example. Density of the current flowing between electrode foil 1 and electrode 2 is not particularly limited, but may range from 0.01 A/cm$^2$ to 10 A/cm$^2$, inclusive, for example.

When metal foil 1 includes a plurality of first regions and a plurality of masking members 4 are disposed to cover the plurality of first regions, for example, etched region 10E sandwiched between non-etched regions 10N are formed on electrode foil 10 obtained in this manner. However, etched region 10E including released side edges T1 and T2 is formed simultaneously. According to this, wrinkle and/or warpage occurring to etched region 10E of metal foil 10 can be suppressed as compared to a conventional method. In addition, a dielectric layer to be described later is formed in etched region 10E. Since electrode foil 10 includes the etched regions at side edges T in longitudinal direction D, the dielectric layer can be easily formed on the strip-shaped electrode foil.

(Fourth Step)

In the fourth step, masking member 4 is removed. When masking member 4 is physically connected with metal foil 1, masking member 4 is peeled from electrode foil 10 to be thereby removed.

(Fifth Step)

Figure 5:
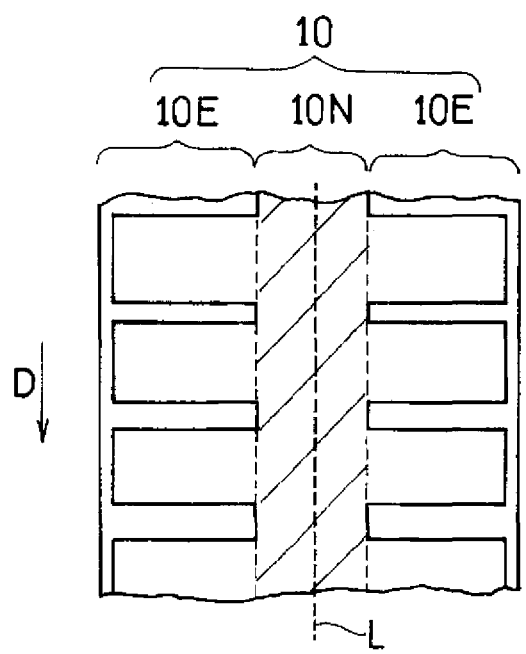
FIG. 5 is a plan view schematically illustrating a position at which the electrode foil is cut.

Partially etched electrode foil 10 may be cut into a desired shape before a step of contact with electrolyte to be described later. Electrode foil 10 is cut so that, for example, etched region 10E is divided in longitudinal direction D. For example, as illustrated in FIG. 5, electrode foil 10 is cut into a shape having a pair of combs along longitudinal direction D, with teeth extending toward sides opposite to each other in a width direction of metal foil 1. In other words, electrode foil 10 is cut such that etched regions 10E serve as a plurality of tongue-piece teeth of a comb. In this case, etched regions 10E cut into the shape having a pair of combs which include the teeth each having one end connected with non-etched region 10N and the other end extended in a width direction of electrode foil 10. The comb teeth formed of each pair of etched regions 10E extend in directions opposite to each other, sharing non-etched region 10N as a handle of the comb. The pair of etched regions 10E in the comb shape are preferably cut such that the pair of etched regions 10E are shaped in line symmetric with respect to central line L of non-etched region 10N, which extends in longitudinal direction D of non-etched region 10N. Central line L is a straight line that equally divides non-etched region 10N into two regions in a transverse direction. In the present embodiment, the comb shape is formed by cutting etched region 10E in the fifth step, but the present disclosure is not limited to this configuration. For example, part of non-etched region 10N may be cut in addition to etched region 10E.

Figure 6:
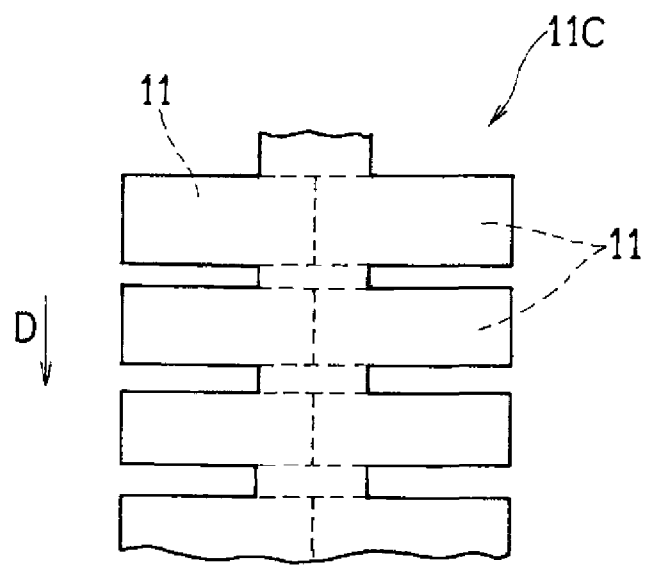
FIG. 6 is a plan view schematically illustrating a coupled body.

As illustrated in FIG. 6, after the fifth step, electrode foil 10 cut as described above is further cut at a predetermined position (dashed line in FIG. 6) in non-etched region 10N into a plurality of electrode foils 11 as individual pieces. In other words, the fifth step is a step of producing coupled body 11C in which a plurality of electrode foils 11 yet to be divided into individual pieces are arranged in two lines in longitudinal direction D. When non-etched region 10N is formed in a strip shape in the longitudinal direction and divided into the individual pieces as illustrated in FIG. 6 in this manner, each electrode foil 11 obtained as an individual piece includes no etched part E at an end face of non-etched region 10N. Thus, obtained electrode foil 11 has increased mechanical strength in non-etched region 10N.

The fifth step only needs to be performed at least after the third step. The fifth step may be performed before or after the fourth step. The fifth step may be performed after a dielectric layer to be described later is formed. When a solid electrolyte layer is formed on a surface of the dielectric layer, the fifth step may be performed, after the dielectric layer is formed, before or after the solid electrolyte layer is formed. Similarly, the fourth step may be performed after the dielectric layer to be described later is formed or after the solid electrolyte layer is formed.

<Capacitor Element>

A capacitor element including electrode foil 10 is produced, for example, as described below. Specifically, capacitor element 20 is produced by a method including a preparation step of preparing an electrode foil produced by a method including the above-described electrolytic etching step, and a layer formation step of forming a dielectric layer on at least one etched surface of etched region 10E of electrode foil 10 and then causing the dielectric layer to contact with electrolyte.

Figure 7:
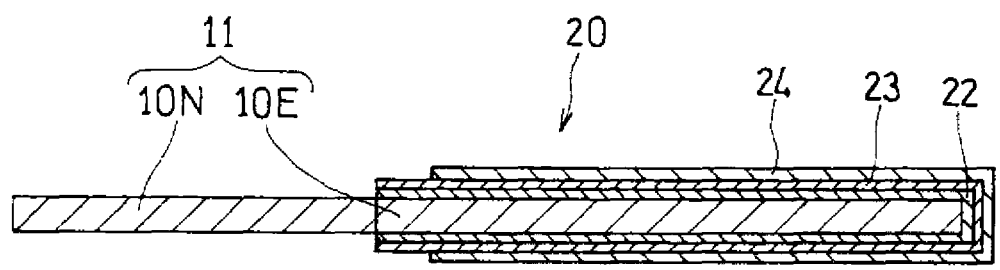
FIG. 7 is a cross-sectional view schematically illustrating a capacitor element included in a capacitor according to the exemplary embodiment of the present disclosure.

FIG. 7 illustrates a cross-sectional view schematically illustrating capacitor element 20 according to the exemplary embodiment. In FIG. 7, dielectric layer 22 and solid electrolyte layer 23 are sequentially formed in etched region 10E of electrode foil 10. Solid electrolyte layer 23 is further covered by cathode extension layer 24. Cathode extension layer 24 is used for connection with a cathode terminal (not illustrated).

(Preparation Step)

In the preparation step, electrode foil 10 is prepared. Electrode foil 10 is produced by a method including the above-described first to third steps. The preparation step may include the fourth step and/or the fifth step described above.

(Layer Formation Step)

In the layer formation step, first, dielectric layer 22 is formed in etched region 10E. Dielectric layer 22 is formed by anodizing the surface of etched region 10E through, for example, anodizing treatment. The anodization may be formed by a well-known method. A method for forming dielectric layer 22 is not limited to the anodization, but any method for forming an insulating layer that functions as a dielectric in etched region 10E is applicable.

Then, solid electrolyte layer 23, as an example of electrolyte, is formed to cover part of dielectric layer 22. Solid electrolyte layer 23 contains, for example, manganese compound and conductive polymer. Examples of the conductive polymer include polypyrrole, polythiophene, polyaniline, and their derivatives.

Solid electrolyte layer 23 containing a conductive polymer can be formed through, for example, chemical polymerization and/or electrolytic polymerization of raw material monomer on dielectric layer 22. Alternatively, solid electrolyte layer 23 can be formed by applying, onto dielectric layer 22, solution in which conductive polymer is dissolved or dispersion liquid in which conductive polymer is dispersed.

Subsequently, cathode extension layer 24 is formed on a surface of solid electrolyte layer 23. Cathode extension layer 24 includes, for example, a carbon layer, and a metal (for example, silver) paste layer formed on a surface of the carbon layer (both layers not illustrated). Such cathode extension layer 24 is formed by sequentially applying carbon paste and silver paste.

The carbon layer is formed to cover at least part of solid electrolyte layer 23. The carbon layer is made of a composition containing conductive carbon material such as graphite. The metal paste layer is made of, for example, a composition containing silver particles and resin. Cathode extension layer 24 is not limited to this configuration. Cathode extension layer 24 only needs to have a power collection function.

<Capacitor>

Figure 8:
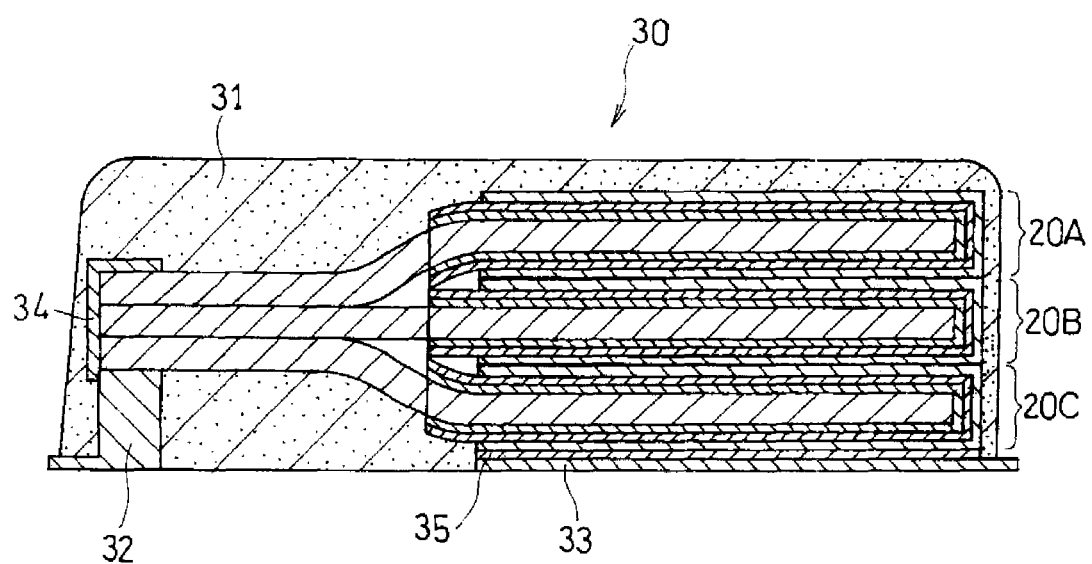
FIG. 8 is a cross-sectional view schematically illustrating a capacitor according to the exemplary embodiment of the present disclosure.

FIG. 8 is a cross-sectional view schematically illustrating capacitor 30 including a plurality of capacitor elements 20A to 20C. As illustrated in FIG. 8, capacitor elements 20 are stacked and disposed in capacitor 30.

A configuration of capacitor 30 according to the present disclosure will be described below in detail. Although capacitor 30 according to the present embodiment includes three capacitor elements 20, a number of included capacitor elements 20 is not limited. Capacitor 30 includes at least one capacitor element 20.

Capacitor 30 includes stacked capacitor elements 20A to 20C, exterior body 31 that seals capacitor elements 20A to 20C, anode terminal 32 electrically connected with electrode foil 10, and cathode terminal 33 electrically connected with cathode extension layer 24. Such capacitor 30 is produced by joining anode terminal 32 and cathode terminal 33 to predetermined positions, respectively, on one of capacitor elements 20 and sealing the stack of capacitor elements 20A to 20C in exterior body 31.

Capacitor elements 20 are joined together by integrally swaging, for example, non-etched regions 10N (not illustrated) through swage member 34, and electrically connected with each other. A method for joining capacitor elements 20 is not limited to the above-described method, but capacitor elements 20 may be joined together by laser welding or resistance welding.

(Exterior Body)

Exterior body 31 is formed of, for example, insulating resin. Examples of the insulating resin include epoxy resin, phenolic resin, silicone resin, melamine resin, urea resin, alkyd resin, polyurethane, polyimide, polyamide-imide, and unsaturated polyester.

(Anode Terminal)

Anode terminal 32 is joined with non-etched region 10N and electrically connected with electrode foil 10. A material of anode terminal 32 is not particularly limited as long as it is an electric conductive material. Anode terminal 32 may be joined with non-etched region 10N through conductive adhesive agent or soldering, or may be joined with non-etched region 10N by resistance welding or laser welding. The conductive adhesive agent is, for example, a composite of any of the above-described insulating materials with carbon particles or metal particles.

(Cathode Terminal)

Cathode terminal 33 is electrically connected with cathode extension layer 24. A material of cathode terminal 33 is not particularly limited as long as it is an electric conductive material. Cathode terminal 33 is joined with cathode extension layer 24 through, for example, the above-described conductive adhesive agent 35.

Although the present embodiment describes a capacitor including solid electrolyte and housing each capacitor element in exterior resin, the present disclosure is not limited to this configuration. For example, the electrode foil according to the present disclosure is applicable to at least one of strip-shaped electrode foils included in an anode and a cathode of a capacitor element of a capacitor. In the capacitor, the capacitor element is housed in a bottomed tubular case. The capacitor element includes the anode and cathode, a separator interposed between the anode and the cathode, and electrolytic solution impregnated as electrolyte in the separator.

An electrode foil and a capacitor produced by the method according to the present disclosure are applicable to various usages because a capacitor element has excellent quality.

What is claimed is:

1. A method for producing an electrode foil, the method comprising:
   a first step of preparing a metal foil containing first metal, the metal foil having a strip shape and a principal surface, the principal surface having a first edge and a second edge which disposed at both sides of the metal foil, respectively, each of the first edge and the second edge extending along a longitudinal direction of the metal foil in plan view of the principal surface;
   a second step of disposing a masking member so as to cover part of the principal surface of the metal foil; and
   a third step of partially etching the principal surface of the metal foil by applying current between the metal foil and an electrode while the metal foil faces the electrode via the masking member in etching liquid after the second step, wherein:
   the masking member has a strip shape, and
   in the second step, the masking member is disposed over the principal surface along a longitudinal direction of the metal foil so as to be away from the first edge and the second edge of the principal surface in the plan view.

2. The method for producing the electrode foil according to claim 1, further comprising a fourth step of removing the masking member after the third step.

3. The method for producing the electrode foil according to claim 1, further comprising a fifth step of cutting the metal foil after the third step, wherein
   in the fifth step, the metal foil is cut into a shape having a pair of combs with teeth extending toward sides opposite to each other in a width direction intersecting the longitudinal direction.

4. The method for producing the electrode foil according to claim 1, wherein the masking member is an insulator.

5. The method for producing the electrode foil according to claim 1, wherein:
   the masking member is an electric conductor, and
   in the third step, the masking member is electrically connected with the metal foil.

6. The method for producing the electrode foil according to claim 5, wherein the electric conductor contains second metal.

7. The method for producing the electrode foil according to claim 6, wherein:
   the electric conductor has a sheet shape, and
   the electric conductor is electrically connected with the metal foil by welding at least part of the electric conductor to the metal foil.

8. The method for producing the electrode foil according to claim 5, wherein, in the third step, a surface of the electric conductor, which faces the electrode, is etched.

9. A method for producing a capacitor, the method comprising:
   a step of preparing the electrode foil produced by the method according to claim 1; and
   a step of forming a dielectric layer on the principal surface of the electrode foil, the principal surface being etched, and then causing the dielectric layer to contact with electrolyte.

10. The method for producing the electrode foil according to claim 1, wherein in the second step, the masking member covers a center portion of the principal surface of the metal foil, while leaving a space between the first edge and the masking member and a space between the second edge and the masking member in plan view.

* * * * *